United States Patent
Sethi et al.

(10) Patent No.: US 10,594,680 B2
(45) Date of Patent: Mar. 17, 2020

(54) COMMUNICATIONS SYSTEM, A STATION, A CONTROLLER OF A LIGHT SOURCE, AND METHODS THEREIN FOR AUTHENTICATING THE STATION TO ACCESS A NETWORK

(71) Applicant: Telefonaktiebolaget LM Ericsson (publ), Stockholm (SE)

(72) Inventors: Mohit Sethi, Espoo (FI); Maziar Mehrabi, Espoo (FI); Le Wang, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 15/572,343

(22) PCT Filed: May 19, 2015

(86) PCT No.: PCT/SE2015/050566
§ 371 (c)(1),
(2) Date: Nov. 7, 2017

(87) PCT Pub. No.: WO2016/186539
PCT Pub. Date: Nov. 24, 2016

(65) Prior Publication Data
US 2018/0139202 A1    May 17, 2018

(51) Int. Cl.
*H04L 29/06* (2006.01)
*H04B 10/116* (2013.01)
(Continued)

(52) U.S. Cl.
CPC ........ *H04L 63/0823* (2013.01); *H04B 10/116* (2013.01); *H04B 10/1141* (2013.01);
(Continued)

(58) Field of Classification Search
CPC .... H04L 63/0823; H04L 63/083; H04L 63/18
(Continued)

(56) References Cited

U.S. PATENT DOCUMENTS

| 7,548,744 B2 | 6/2009 | Oesterling et al. |
| 8,694,782 B2 * | 4/2014 | Lambert ............. H04L 63/0823 713/168 |

(Continued)

FOREIGN PATENT DOCUMENTS

WO    2007045937 A1    4/2007

OTHER PUBLICATIONS

Perkovic, "BlinkComm: Initialization of IoT Devices Using Visible Light Communications", Apr. 2018, Wiley, pp. 1-16 (Year: 2018).*
(Continued)

*Primary Examiner* — Alexander Lagor
*Assistant Examiner* — Gregory A Lane
(74) *Attorney, Agent, or Firm* — Sage Patent Group

(57) ABSTRACT

A method performed by a communications system, for authenticating a station, STA, to access a network is provided. The STA is capable of communicating with a light source. The method includes sending, by a management server to a controller of the light source, network access information, sending, by the light source to the STA, the received network access information, which network access information is sent to the STA via a Visual Light Communication (VLC) channel. The VLC channel is emitted from the light source and received by a light detector in the STA. The STA is authenticated to the network by sending the received network access information to an Access Point (AP) operating in the network in which the STA communicates with the AP via a communication channel.

16 Claims, 10 Drawing Sheets

(51) Int. Cl.
  *H04W 84/12* (2009.01)
  *H04W 12/08* (2009.01)
  *H04B 10/114* (2013.01)
  *H04W 88/06* (2009.01)

(52) U.S. Cl.
  CPC ........ *H04B 10/1149* (2013.01); *H04L 63/083* (2013.01); *H04L 63/18* (2013.01); *H04W 12/08* (2013.01); *H04W 84/12* (2013.01); *H04W 88/06* (2013.01)

(58) Field of Classification Search
  USPC .......................................................... 726/4
  See application file for complete search history.

(56) References Cited

U.S. PATENT DOCUMENTS

| | | | |
|---|---|---|---|
| 2008/0136621 A1* | 6/2008 | Malik | H04W 48/14 340/539.1 |
| 2011/0119745 A1 | 5/2011 | Bremner | |
| 2013/0152168 A1* | 6/2013 | Nasir | H04W 12/08 726/4 |
| 2013/0330088 A1 | 12/2013 | Oshima et al. | |
| 2014/0057676 A1 | 2/2014 | Lord et al. | |
| 2014/0072119 A1 | 3/2014 | Hranilovic et al. | |
| 2014/0086590 A1 | 3/2014 | Ganick et al. | |
| 2014/0123251 A1* | 5/2014 | Takami | H04L 63/0876 726/5 |
| 2014/0380443 A1 | 12/2014 | Stark et al. | |
| 2015/0223277 A1* | 8/2015 | Jovicic | H04W 76/14 455/41.2 |

OTHER PUBLICATIONS

International Search Report and Written Opinion dated Dec. 23, 2015 for International Application Serial No. PCT/SE2015/050566, International Filing Date: May 19, 2015 consisting of 15-pages.
Rajagopal et al. Title: "Visual Light Landmarks for Mobile Devices" IEEE Press Piscataway, Berlin, Germany, Apr. 15-17, 2014 consisting of 12-pages.
European Search Report dated Apr. 16, 2018 for International Application Serial No. 15892704, consisting of 3-pages.

* cited by examiner

COMMUNICATIONS SYSTEM, A STATION, A CONTROLLER OF A LIGHT SOURCE, AND METHODS THEREIN FOR AUTHENTICATING THE STATION TO ACCESS A NETWORK

CROSS-REFERENCE TO RELATED APPLICATIONS

This application is a Submission Under 35 U.S.C. § 371 for U.S. National Stage Patent Application of International Application Number: PCT/SE2015/050566, filed May 19, 2015 entitled "A COMMUNICATIONS SYSTEM, A STATION, A CONTROLLER OF A LIGHT SOURCE, AND METHODS THEREIN FOR AUTHENTICATING THE STATION TO ACCESS A NETWORK," the entirety of which is incorporated herein by reference.

TECHNICAL FIELD

Embodiments herein relate to a communications system, and a method therein. Embodiments herein further relate to a Station (STA) and a controller of a light source and methods therein. In particular, they relate to authenticating the STA to access a network.

BACKGROUND

Wi-Fi, or WiFi, is a local area wireless computer networking technology that allows electronic devices access to network. A Wi-Fi network makes use of radio waves to transmit information across a network. Wi-Fi is based on the Institute of Electrical and Electronics Engineers' (IEEE) 802.11 standards. To connect to a Wi-Fi LAN, a computer has to be equipped with a wireless network interface controller. Wi-Fi technology may be used to provide Internet access to devices that are within the range of a wireless network. Devices may access a network resource such as the Internet via a wireless network Access Point (AP). The AP may provide Internet access over cable or cellular networks such as Second Generation (2G), Third generation (3G), Long Term Evolution (LTE) etc. among other options.

WiFi APs may provide user devices with access to a network resource such as the Internet, without authenticating them. However, since this is insecure and vulnerable to attacks, AP owners may provide security by authentication the users and encrypting traffic.

Offering Wi-Fi connections is a crucial service provided by businesses to attract customers. Organizations and businesses, such as hotels, airports, and restaurants, often provide hotspots wither free-of-charge or commercially, using a captive portal webpage for access.

For example, to join a wireless network at a hotel, a distinct network name and particular configuration instructions are needed for connecting. However, there are several known issues of this traditional Wi-Fi access management, which are presented below.

To login an end user device to a hotel's wireless networks, a correct access information is required to be entered in the end user device. It is often asked for a combination of a customer's last name, room number and a special passcode to be entered. Then the user of the end user device has to make sure all the information is entered into the right boxes correctly. Typing all the information into small text boxes on an end user device such as a mobile device causes reduction of use experience of staying at the hotel.

Further, the user of the end user device needs to make sure to be connected to the correct hotel network. Fake or poseur networks often show up as a way to lure hotel customers to give private information away unknowingly.

It is often found that when connecting to the hotel's network, the web-loading speed is extremely slow. One of the typical reasons is that many customers are using the same resources, at the same time. The problem is often caused by less considerate implementation of Wi-Fi access points in the building, leading too many connections to one access point.

Free Wi-Fi connections are also offered as one of the services in a hotel. Traditionally, the wireless network name such as a Service Set Identification (SSID) may be embedded in beacon signals broadcasted by a wireless access point to be heard by end user devices within radio range of the access point. Thus, the SSID becomes publically visible to all the Wi-Fi end user devices in the range. However, a business owner does not want to advertise the information to all the Wi-Fi end user devices, only to specific Wi-Fi end user devices being inside the premises especially.

Wi-Fi Protected Access (WPA) and Wi-Fi Protected Access II (WPA2) are two security protocols and security certification programs that provide secure wireless network access.

The WPA2-Personal mode of WPA2 provides security based on pre-shared passwords among users.

WPA2-Personal provides security based on pre-shared passwords among users. However, this is not convenient as the user of a wireless device first needs to obtain correct SSID and password and then enter them for authentication and successful Internet access. Additionally, the passwords are vulnerable against guessing and cracking since they are not updated frequently.

The WPA2-Enterprise mode of WPA2 provides security based on the IEEE 802.1X standard. IEEE 802.1X is an IEEE Standard for Port-based Network Access Control (PNAC) and is part of the IEEE 802.1 group of networking protocols. It provides an authentication mechanism to devices wishing to attach to a Local Area Network (LAN) or Wireless Local Area Network (WLAN).

IEEE 802.1X uses an authentication server to validate users and provide network access. On wireless networks, IEEE 802.1X may work with WPA, WPA2, or Wired Equivalent Privacy (WEP) keys. This type of authentication is typically used when connecting to an enterprise network. However, this requires Wi-Fi users to obtain access credentials off-line, resulting in unnecessary troubles, like visiting or ringing front-desk at a hotel for username and password.

SUMMARY

It is therefore an object of embodiments herein to improve the authentication of a device, referred to herein as a station to access a network and the user experience of a user of the station wishing to access a network.

According to a first aspect of embodiments herein, the object is achieved by a method performed by a communications system, for authenticating a station, STA, to access a network. The STA is capable of communicating with a light source. The method comprises:

Sending by a management server to a controller of the light source, network access information, Sending by the light source to the STA, the received network access information, which network access information is sent to the STA via a Visual Light Communication, VLC, channel, which VLC channel is emitted from the light source and received by a light detector in the STA, Authenticating by the STA, the STA to the network by sending the received network access information to an Access Point, AP, operating in the network, wherein the STA communicates with the AP via a communication channel.

According to a second aspect of embodiments herein, the object is achieved by a method performed by a Station, STA, for authenticating in the STA to a network. The STA is capable of communicating with a light source, the method comprises:

Receiving network access information from a management server via a Visual Light Communication, VLC, channel, which VLC channel is emitted from the light source and received by a light detector in the STA.

Authenticating the STA to the network by sending the network access information to an Access Point, AP, operating in the Network, which STA communicates with the AP via a communication channel.

According to a third aspect of embodiments herein, the object is achieved by a method performed by a controller of a light source for providing authentication of an STA to access a network. The STA is capable of communicating with the light source. The controller of the light source manages the light source to perform the method comprising:

Sending network access information to the STA. The network access information is received from a management server and sent to the STA via a Visual Light Communication, VLC, channel. The VLC channel is emitted from the light source. The network access information enables the STA to authenticate to the network by sending the network access information via a communication channel to an Access Point, AP, operating in the Network.

According to a fourth aspect of embodiments herein, the object is achieved by a communications system for authenticating a Station, STA, to access a network. The STA is capable of communicating with a light source. The communications system comprises:

A management server being configured to send to a controller of the light source, network access information.

The light source is configured to send to the STA, the received network access information. The network access information is to be sent to the STA via a Visual Light Communication, VLC, channel. The VLC channel is adapted to be emitted from the light source and received by a light detector in the STA.

The STA is configured to authenticate the STA to the network by sending the received network access information to an Access Point, AP, operating in the network, wherein the STA is adapted to communicate with the AP via a communication channel.

According to a fifth aspect of embodiments herein, the object is achieved by a Station, STA, for authenticating in the STA to a network. The STA is capable of communicating with a light source. The STA is configured to:

Receive network access information from a management server via a Visual Light Communication, VLC, channel, which VLC channel is to be emitted from the light source and received by a light detector in the STA.

Authenticate the STA to the network by sending the network access information to an Access Point, AP, adapted to operate in the Network, which STA is arranged to communicate with the AP via a communication channel.

According to a sixth aspect of embodiments herein, the object is achieved by a controller of a light source for providing authentication of an STA to access a network. The STA is capable of communicating with the light source. The controller of the light source is configured to manage the light source to send to the STA network access information. The network access information is to be received from a management server and sent to the STA via a Visual Light Communication, VLC, channel. The VLC channel is adapted to be emitted from the light source. The network access information enables the STA to authenticate to the network by sending the network access information via a communication channel to an Access Point, AP, operating in the Network.

Embodiments herein provide the following advantages:
Convenient login
Precise location-based access control
Anonymity/Security
Energy Saving
Other location-based services for Wi-Fi users
Stations can discover APs on unsupported bands, for example a station using 802.11n can at least know that there are is AP that support 802.11a only and inform the user about this issue

BRIEF DESCRIPTION OF THE DRAWINGS

Examples of embodiments herein are described in more detail with reference to attached drawings in which.

DETAILED DESCRIPTION

One example of the object of embodiments herein is to improve use experience of authenticating and accessing Wi-Fi networks, and provide efficiency into the system.

Example of embodiments herein relate to methods and a system for authorizing access to Wi-Fi users with convenient login process and fine-grained access control by using Visible Light Communication (VLC).

For example, embodiments herein provide a system and methods that provides convenient and efficient authentication and access control for wireless users in places, like hotels, offices and so on. Instead of obtaining login credentials off-line, a device with Wi-Fi module and embedded VLC receiver (e.g. camera, photodetector) may obtain the information such as e.g. credentials directly via visual light emitted from management server controlled light sources such as e.g. LEDs.

Embodiments herein further provide convenience for users of stations when connecting stations to Wi-Fi networks. With the help of VLC, one does not need to ask username/password from info desk or anywhere else explicitly. Once a user is in the range of light sources, the access is granted implicitly. One main point missing from the draft is the purpose or problem we want to solve.

Figure 1:
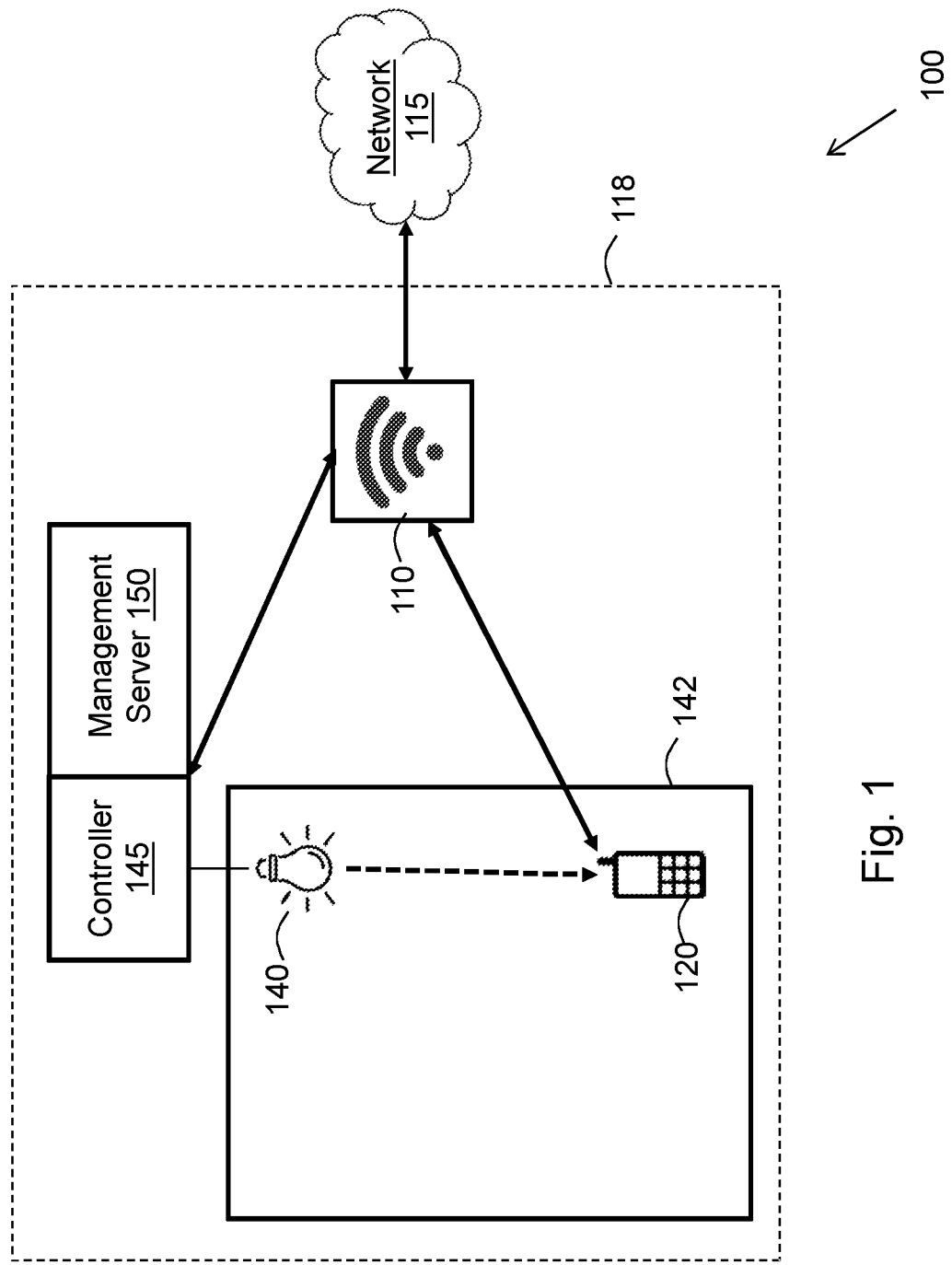
FIG. 1 is a schematic block diagram illustrating embodiments of a communications system.

FIG. 1 shows a communications system 100 in which embodiments herein may be implemented. The communications system 100 may e.g. comprises a Wireless Local Access Network (WLAN), a Cellular network or any other wireless networks.

One or more APs operate in the communications system 100, whereof one, an AP 110 is depicted in FIG. 1. The one or more APs may represent an access network such as a WiFi network. The AP 110 is an access point providing access to a network 115 for end user devices such as STAs. The network 115 may e.g. be the Internet, or any private WLAN.

The AP 110 is capable of exchange authentication messages with e.g. a Wi-Fi client in a STA and provides network connections such as e.g. Internet or intranet connections. The outer frame 118 in FIG. 1 resembles an area covered by signals such as Wi-Fi signals provided by the APs. Users of devices such as a STA 120 who receive credentials through light sources of the supported area will be authorized to get access the network 115 via AP 110.

One or more STAs are located in the communications system 100, whereof one, the STA 120 is depicted in FIG. 1. The STA 120 may be a user equipment, a mobile wireless terminal, a mobile phone, a computer, a tablet computer, sometimes referred to as a surf plate, with wireless capabilities, or any other units capable to communicate with the communications system 100.

The STA 120 may comprise a module for accessing a network via the AP 110. The module may e.g. be a Wi-Fi module comprising a Wi-Fi client that receives Wi-Fi login credentials through a light source.

The STA 120 communicates with the AP 110 via a communication channel, such as the IEEE 802.11n.

The STA 120 further comprises a light detector which may receive a VLC channel. The light detector may e.g. be a VLC receiver such as e.g. a camera, or a photodetector.

The STA 120 is thus capable of communicating with a light source 140. The light source 140 may e.g. be a LED. The light source 140 is capable of emitting a VLC channel which e.g. may be received by the light detector in the STA 120. The light source 140 may e.g. be a VLC-capable light bulb.

Light sources such as the light source 140 may be located in individual rooms and other spaces or areas of a building such as an office building or hotel. The light source 140 may e.g. be located in a room 142. The room 142 may be a hotel room, a room in an office or any kind of room. When the STA 120 is located in the same room 142 or other space as the light source 140 preferably in visible sight to the light source 140, it is capable of receiving a VLC channel emitted from the light source 140. The minimum distance from the STA 120 to the light source 140 to be visible depends on the sensitivity of photodetector or camera in the STA 120, the brightness of light source 140 and algorithms used.

Each light source such as the light source 140 is controlled by a respective controller, herein referred to as a controller 145 of the light source 140. The controller 145 may be an external controller or may be built-in the light source. The controller 145 may encode and the light source 140 sends to the STA 120, information such as network login credentials via the light source 140.

The light source controllers such as the controller 145 of the light source 140 are in communication with a management server 150. The controller 145 may e.g. be collocated with the light source 140 as mentioned above or with the management server 150 or it may be a unit by itself. The management server 150 signals to light controllers such as the controller 145, and authenticates Wi-Fi users such as the STA 120.

In this way the STA 120 is capable of obtain network access information such as e.g. network access credentials directly from the management server 150 via visual light such as the VLC channel emitted from the light source 140 being controlled by the controller 145, instead of obtaining login credentials off-line.

VLC

In general, Visual Light Communication (VLC) provides a high data-rate and low-cost network link. VLC systems have the potential for high signal-to-noise ratios, and may be contained easily within walls providing a high degree of spatial diversity.

VLC provides a communication scheme that e.g. enables interior ambient light sources such as the light source 140 which may be related to LED lighting systems to send data to devices using either cameras or light sensors. By e.g. exploiting rolling shutter camera sensors that are common on tablets, laptops and smartphones such as the STA 120, it is possible to detect high-frequency changes in light intensity reflected off of surfaces and in direct line-of-sight of the camera. The VLC may use a demodulation approach that e.g. allows smartphones to accurately detect frequencies as high as 8 kHz with 0.2 kHz channel separation. In order to avoid humanly perceivable flicker in the lighting, a VLC system may e.g. operate at frequencies above 2 kHz and compensate for the non-ideal frequency response of standard LED drivers by adjusting the light's duty-cycle.

Embodiments herein uses VLC, which is a data communication medium using visible light from the light source 140 for data transmission. Using controlled VLC light sources such as the light source 140 controlled by the controller 145, to embed login information into a visual channel would bring an efficient and convenient way to access secured wireless networks such as e.g. the network 115.

LEDs have become increasingly popular e.g. in hotels over the past few years. Deploying or upgrading current lighting system would give the hotel a light makeover, and create relaxing or uplifting social areas to welcome guests and make them feel comfortable. Thus, to have VLC-capable LEDs would not be costly for business owners.

Since a VLC-based LED is also used for indoor positioning, the location of LED may directly inform e.g. a hotel's authentication system which hotel room or area the LED covers. Despite other radio spectrum methods, such as short-wave radio or Wi-Fi, visible light cannot travel through non-transparent physical material e.g. wall, ceiling. This advantage allows embodiments herein to provide localization by identifying individual rooms and other spaces. Embodiments herein may also broadcast sensitive information without concerning about eavesdropping happening from outside of the areas. Thus, the light source 140 may be programmed by the management server 150 via the controller 145 to flash coded signals in lighting with high-frequency on-off changes in order to convey login information to a device such as the STA 120 with embedded camera. Once the device obtains the information, it may authenticate itself against the management server 150 in order to join the network such as the network 115.

Embodiments herein provide to use VLC as a visual channel to transmit information, such as SSID, BSSID, channel, username and password, to devices such as the STA 120 with e.g. embedded camera and Wi-Fi module for connecting to wireless networks.

SSID and BSSID are information about the network. They tell which WIFI access point the station may try and connect with.

Embodiments of a method will first be described in a general way from the perspective of the communications system 105.

Figure 2:
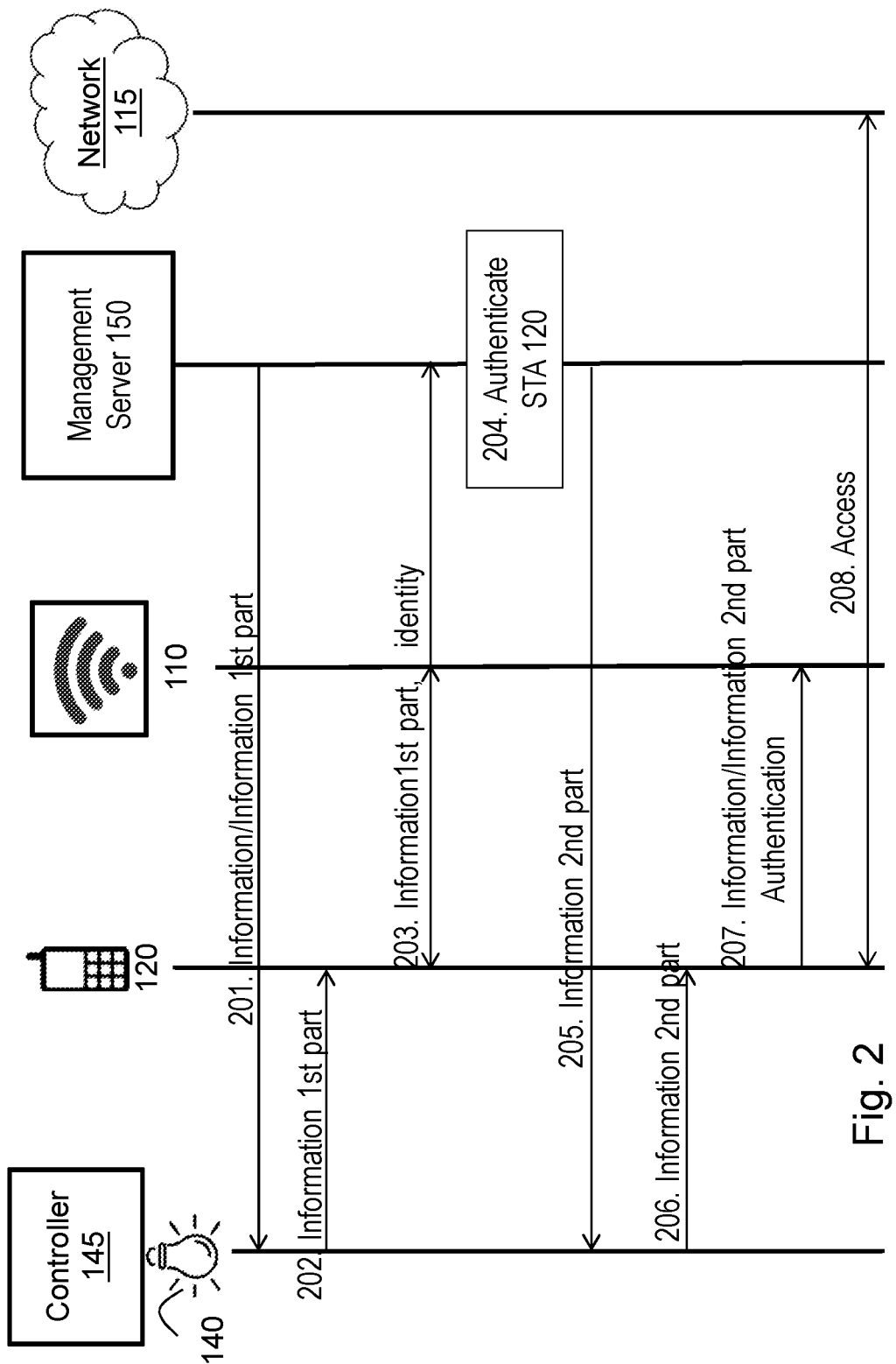
FIG. 2 is a sequence diagram depicting embodiments of a method.

Example embodiments of the method performed by a communications system 105, for authenticating the STA 120 to access a network 115, will now be described with reference to a sequence diagram depicted in FIG. 2. The STA 120 is capable of communicating with the light source 140.

The method comprises the following actions, which actions may be taken in any suitable order.

According to an example scenario, the STA 120 is about to access to the network 115 via the AP 110.

Action 201

To access the network 115 via the AP, the STA needs some credentials. The management server 150 sends network access information to the controller 145 of the light source 140.

The network access information such as the network access credentials may e.g. be provided to the management server 150 either manually by a network administrator or owner or may be discovered over the network automatically.

The network access information may comprise any one or more out of: a Service Set Identification, SSID, a Basic Service Set Identification, BSSID, Communication channel information, username, password, certificates, channel and cipher suites supported among other such information, and credentials for the AP 110 that provides network access.

The controller 145 provides the network access information to the light source 140.

Action 202

The light source 140 sends the received network access information to the STA 120. The controller 145 manages the light source 140 to perform the sending of the network access information. The network access information is sent to the STA 120 via a VLC channel. The VLC channel is emitted from the light source 140 and received by a light detector in the STA 120.

In some embodiments, only a first part of the network access information is sent to the STA 120 via the VLC channel, before the STA 120 authenticates to the network 115. In these embodiments the optional actions 20-206 below will be performed wherein a second part of the network access information will be sent in action 206. The first part of the network access information may e.g. comprise SSID and BSSID, and the second part of the network access information may comprise a password. This will be explained ore in detail below.

Action 203

In some embodiments, the AP 110 may receive the first part network access information and an identity of the STA 120 from the STA 120, and send it to the management server 150.

In this action the STA 120 may send the first part network access information to the AP 110. Upon receiving the first part network access information, the AP requests an identity of the STA 120. The STA 120 then sends the requested identity to the AP 110.

Action 204

In some embodiments, the management server 150 authenticates the STA 120 by using the received identity of the STA 120.

Action 205

The management server 150 sends the second part of the network access information to the controller 145 of light source 140, when the STA 120 has been successfully authenticated.

Action 206

The light source 140 then sends the received second part of the network access information to the STA 120 via the VLC channel.

Action 207

The STA 120 authenticates the STA 120 to the network 115 by sending the received network access information to the AP 110 operating in the network 115. The STA 120 communicates with the AP 110 via a communication channel.

In some embodiments only the received second part of the network access information is sent at this stage.

Action 208

The STA 120 may now access the network 115.

Embodiments of the method described above will now be described in a general way, first from the perspective of the STA 120 and then from the perspective of the controller 145 of a light source 140. This will be followed by a more detailed description with examples and explanations.

Figure 3:
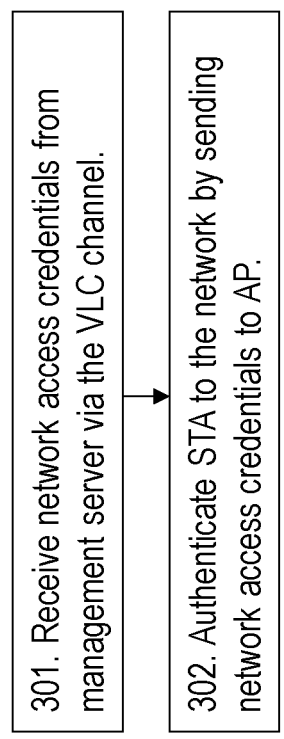
FIG. 3 is a flowchart depicting embodiments of a method in a STA.

Example embodiments of a method performed by the STA 120 for authenticating the STA 120 to a network 115, will now be described with reference to a flowchart depicted in FIG. 3. As mentioned above the STA 120 is capable of communicating with a light source 140. According to the example scenario, the STA 120 wish to access to the network 115 via the AP 110.

The method comprises the following actions, which actions may be taken in any suitable order.

Action 301

In the example scenario the STA 120 is located in the same space or room 142 as the light source 140, and preferably in visible sight of the light source 140. The STA 120 is thus capable to communicate with the light source 140 by using VLC. The STA 120 receives network access information from the management server 150 via the VLC channel. The VLC channel is emitted from the light source 140 and received by the light detector in the STA 120.

The network access information may comprise any one or more out of: a Service Set Identification, SSID, a Basic Service Set Identification, BSSID, communication channel information, username, password, certificates, channel and cipher suites supported in addition to the SSID and the password, and credentials for the AP 110 that provides network access.

Action 302

Now the STA has obtained the network access information and is enabled to start to access the network 115. Thus, the STA 120 authenticates the STA 120 to the network 115 by sending the network access information to the AP 110 operating in the network 115. The STA 120 communicates with the AP 110 via a communication channel.

In some embodiments, a first part of the network access information is received before starting the authentication. In these embodiments, this action of authenticating the STA 120 to the network 115 comprises:

sending the first part of the network access information to the AP 110, to authenticate the STA 120, sending an identity of the STA 120 to the AP 110 upon request, receiving a second part of the network access information from the management server 150 via the VLC channel, sending the second part of the network access information to the AP 110.

The first part of the network access information may comprise any one or more out of an SSID and a BSSID. The second part of the network access information may comprise a password.

In some embodiments this action of authenticating 301 the STA 120 to the network 115 further comprises selecting a data rate for communication with the network 115.

Figure 4:
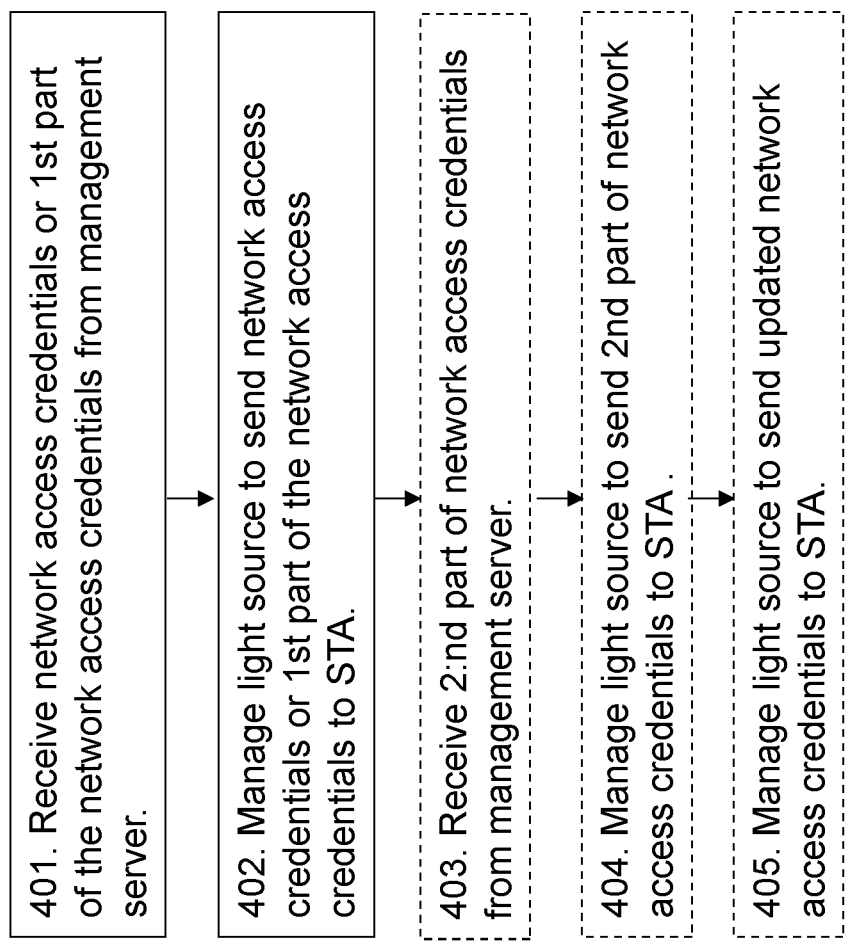
FIG. 4 is a flowchart depicting embodiments of a method in a controller of a light source.

Example embodiments of a method performed by the controller 145 of the light source 140 for providing authentication of an STA 120 to access a network 115 will now be described with reference to a flowchart depicted in FIG. 4. As mentioned above the STA 120 is capable of communicating with the light source 140. According to the example scenario, the STA 120 wishes to access to the network 115 via the AP 110.

The controller 145 of the light source 140 manages the light source 140 to perform the method comprising the following actions, which actions may be taken in any suitable order. Dashed lines of boxes in FIG. 4 indicate that this action is not mandatory.

Action 401

The controller 145 of the light source 140 receives network access information or a first part of the network access information from the management server 150.

The network access information may comprise any one or more out of: a Service Set Identification, SSID, a Basic Service Set Identification, BSSID, communication channel information, username, password, certificates, channel and cipher suites supported in addition to the SSID and the password, and credentials for the AP 110 that provides network access.

Action 402

The controller 145 of the light source 140 manages the light source 140 to send the network access information to the STA 120. The network access information is sent to the STA 120 via a VLC channel. The VLC channel is emitted from the light source 140. The network access information enables the STA 120 to authenticate to the network 115 by sending the network access information via a communication channel to the AP 110 operating in the Network 115.

In some embodiments, only the first part of network access information is sent to the STA 120 via the VLC channel before the STA 120 starts the authentication to the network 115. In these embodiments the optional actions 40-404 below will be performed wherein a second part of the network access information will be sent in action 204.

Action 403

The controller 145 of the light source 140 receives a second part of the network access information from the management server 150, when the STA 120 has been successfully authenticated.

Action 404

The controller 145 of the light source 140 manages the light source 140 to send the second part of the network access information to the STA via the light source 140.

In some embodiments, the first part of the network access information comprises any one out of SSID and BSSID, and the second part of the network access information comprises a password.

Action 405

The controller 145 of the light source 140 may manage the light source 140 to send updated network access information to the STA 120.

This may be performed repeatedly according to a predetermined frequency.

Embodiment's herein will now be further described and explained. The text below is applicable to and may be combined with any suitable embodiment described above.

According to embodiments herein, sensitive information is sent through the light source 140, and the STA 120 may receive this information by any photon receiver such as camera built-in mobile phones, computers or any other light-receiving device/demodulator including the STA 120. The lightening infrastructure of the light source 140 may be used for this purpose. As mentioned above, the light source 140 is controlled by the controller 145, which controller 145 is in communication with the management server 150. This communication may be one-way, from the management server to controller 145, or bi-directional. The management server 150 sends sensitive information to light controllers such as the controller 145 to be transmitted through the respective light source including the light source 140.

As a transmission through light takes place in very high speed frequencies, a human eye cannot perceive any change in its surrounding ambient light. To not perceive any changes by human eyes, the frequency has to be over 1 KHz. On-off keying denotes an Amplitude-Shift Keying (ASK) modulation. This fact allows exploitation of capacities of existing lightening system as a medium to hide the information transmission.

The outer frame 118 in FIG. 1 resembles the area covered by Wi-Fi signals. Users of devices such as the STA 120 who receive the credentials through the lightening system of the supported area will be authorized to get access to the Wi-Fi network. This authorization is controlled by the management server 150 which updates the credential information in the AP 110, other associated APs, the light source 140 via the controller 140, and other associated light sources frequently. Users of devices without the knowledge of recent credentials are considered to be outside of the pre-defined area and hence will not be authorized to get connected to the network 115.

Embodiments herein may work both with WPA2-Personal and WPA2-Enterprise certifications. In the simplest form of the embodiments herein, the VLC is simply used for communicating a password for obtaining Internet Access via the AP 110. The STA 120 is still responsible for selecting the appropriate access point e.g. from a list of access points detected in its ambient environment. This may be circumvented and the whole process may be automated by also communicating a SSID over the VLC channel. An application of the STA 120 may then simply be opened and the STA 120 would connect with the AP 110 using the SSID and password received over the VLC channel without requiring any further user action.

Figure 5:
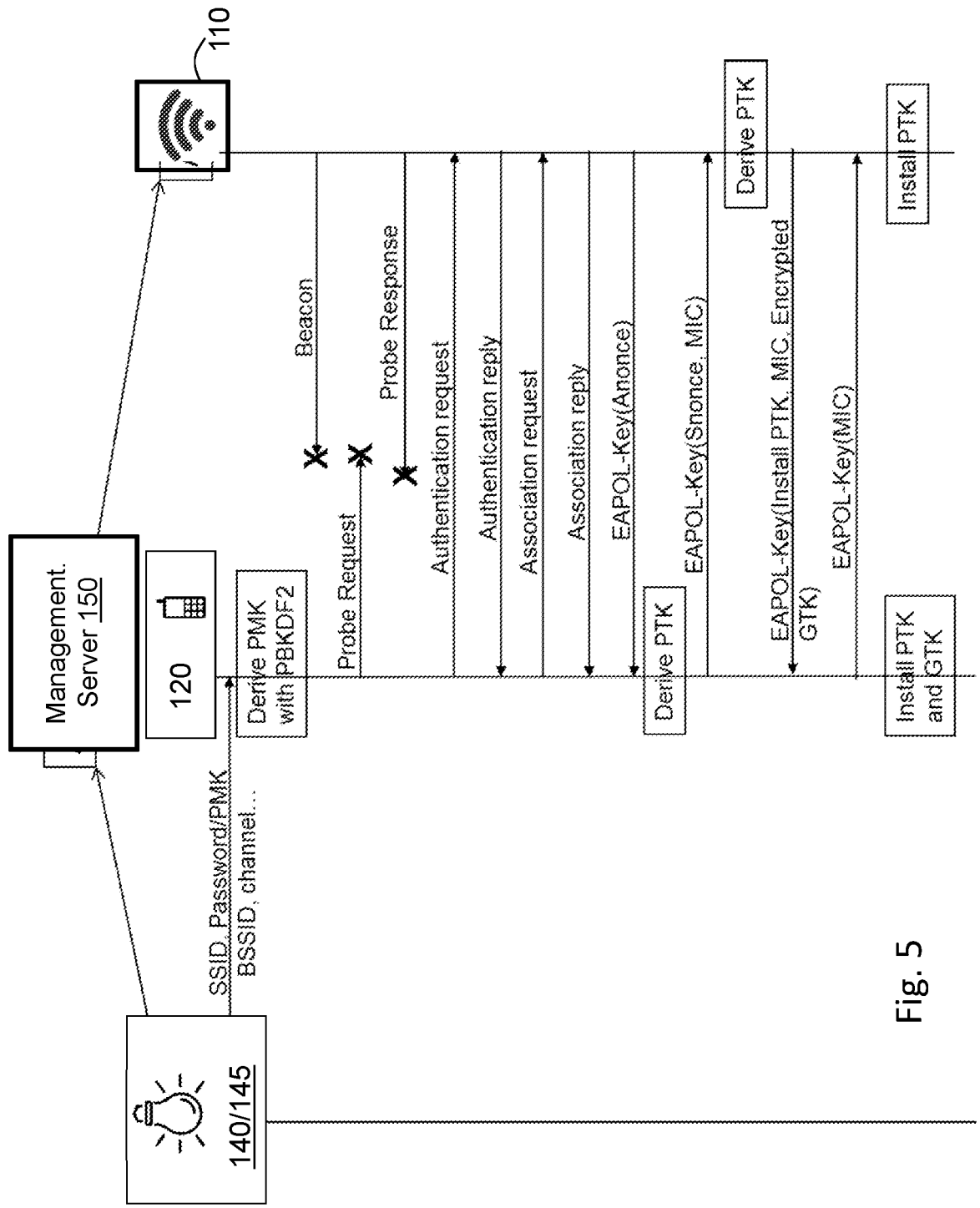
FIG. 5 is a sequence diagram depicting embodiments of a sequence of actions performed in a communications system.

FIG. 5 depicts an embodiment using WPA Personal WiFi authentication with VLC communication.

The management server 150 may change the information, i.e. the credentials transmitted on the VLC channel, the passwords may be frequently updated for increased security. Additionally, since the user of a STA is no longer responsible for obtaining the password from the reception or the wall and entering them into the system, the passwords may be much more complex to protect against guessing or cracking or dictionary attacks.

However, as is seen in FIG. 5, the VLC channel may also be used for communicating additional information such as the BSSID, channel and cipher suites supported in addition to the SSID and password. This may provide several additional benefits.

The APs such as the AP 110 no longer have to broadcast a beacon message on an IEEE 802.11 wireless interface thereby saving energy. This is marked with X in FIG. 5

Probe request and response messages no longer need to be exchanged. All the necessary information is already available to the STA 120 over the VLC channel and the STA 120 may ensure that it supports one of the advertised data rates for the connection to the network to succeed. This implies that data rate selection is now done by the STA 120 instead of the AP 110.

By not broadcasting the beacon message may also provide some level of anonymity, hiding the fact there is a Wi-Fi service with a given SSID in that building. Users of devices that do not have access to the VLC channel, i.e. those devices that are not physically present where the Wi-Fi service is offered, would not see the AP in their list unless they send a probe request. An AP may choose not to respond to those probe requests to provide additional protection.

The access control may be improved. E.g. in an office environment some rooms will receive BSSID and other necessary credentials for an AP that provides access to both the Internet and Intranet. Other areas of the office building will receive credentials for access points that only provide Internet access.

On-demand rekeying may be provided. Rekeying may be triggered by either the management server 150 or STA users themselves such as the user of the STA 120 whenever a STA is within the range a light source according to embodiments herein. For example by pressing a switch in the room/please give an example of this here: The light source 110 may send new keys to the STA 120 and old ones may be invalidated.

Many enterprise scenarios require much more fine-grained user/device authentication/access control and therefore rely on IEEE 802.1x based authentication. IEEE 802.1X defines encapsulation of the Extensible Authentication Protocol (EAP) over IEEE 802. Embodiments herein may be integrated with such WPA2-Enterprise certified 802.1x based authentication as well.

In a simplest manifestation of these embodiments, an authentication server e.g. being part of the AP 110 or the management server can support RADIUS/DIAMETER or similar protocols. Remote Authentication Dial In User Service (RADIUS) and DIAMETER are Authentication, Authorization, and Accounting (AAA) protocols for users who connect and use a network service may simply configure the VLC channel to communicate the same Network Access Identifier (NAI) and credentials, depending on the EAP method used, for all user devices such as the STA 120. So for Extensible Authentication Protocol (EAP)-Pre-Shared Key (PSK) it may be the password that is comprised in the network access information while for EAP-Transport Layer Security (TLS) it may be the client side certificate that is comprised in the network access information. However, such sharing of same access credentials among all users defeats the purpose of IEEE 802.1x fine-grained authentication.

Figure 6:
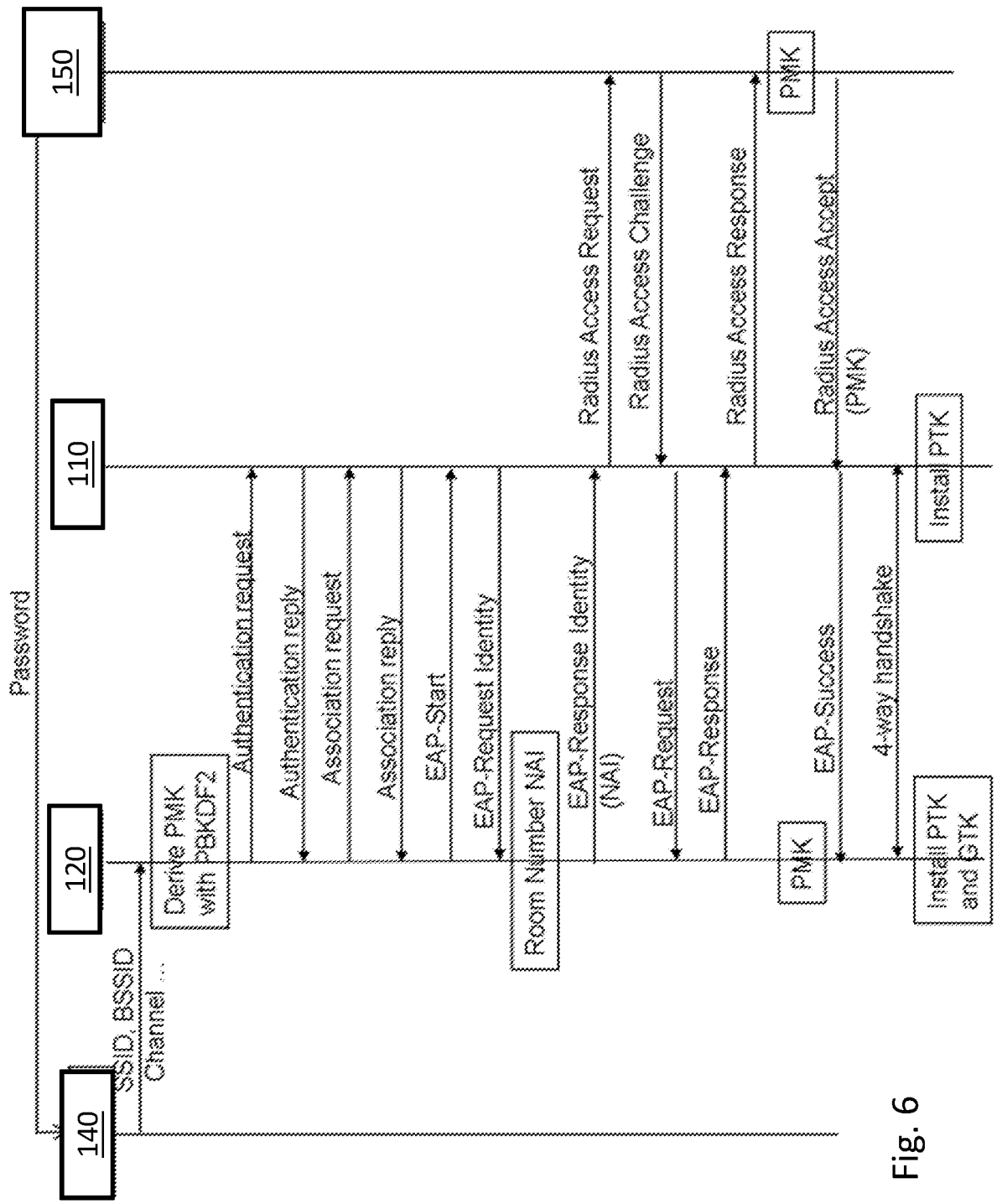
FIG. 6 is a sequence diagram depicting embodiments of a sequence of actions performed in a communications system.

FIG. 6 depicts a WPA-Enterprise 802.1x authentication with visible light communication. As shown in FIG. 6 this may be improved by only communicating the network access information such as the SSID, BSSID, data rate etc. details on the VLC channel. A network application on the STA 120 may automatically start the connection request to the AP 110 upon receiving the network access information. When the AP 110 sends an EAP-Identity request, the STA 120, such as an application the STA 120, prompts the STA 120 for the appropriate username. From there on, multiple EAP Request Responses are sent between the STA 120, such as the application the STA 120 (supplicant) and the authorization server 150 until the STA 120 or the user of the STA 120 is successfully authenticated. Thereafter, the authorization server 150 sends a Radius Accept message along with the PMK to the AP 110. The AP 110 and the STA 120 finally use this PMK for performing a 4-way handshake and deriving Pairwise Transient Keys (PTK) and/or Groupwise Transient keys (GTK).

While 802.1x authentication with username password such as EAP-PSK or certificates etc., depending on the exact EAP method used, works well in many enterprise scenarios such as offices, such strong user authentication may not be required in other scenarios, such as a Wi-Fi service provided by a hotel for its guests. For example, a hotel network administrator may only want to ensure that there is a valid guest and he is situated somewhere on the hotel premises. Distributing passwords or client-side certificated for 802.1x authentication in such a scenario would be challenging.

Figure 7:
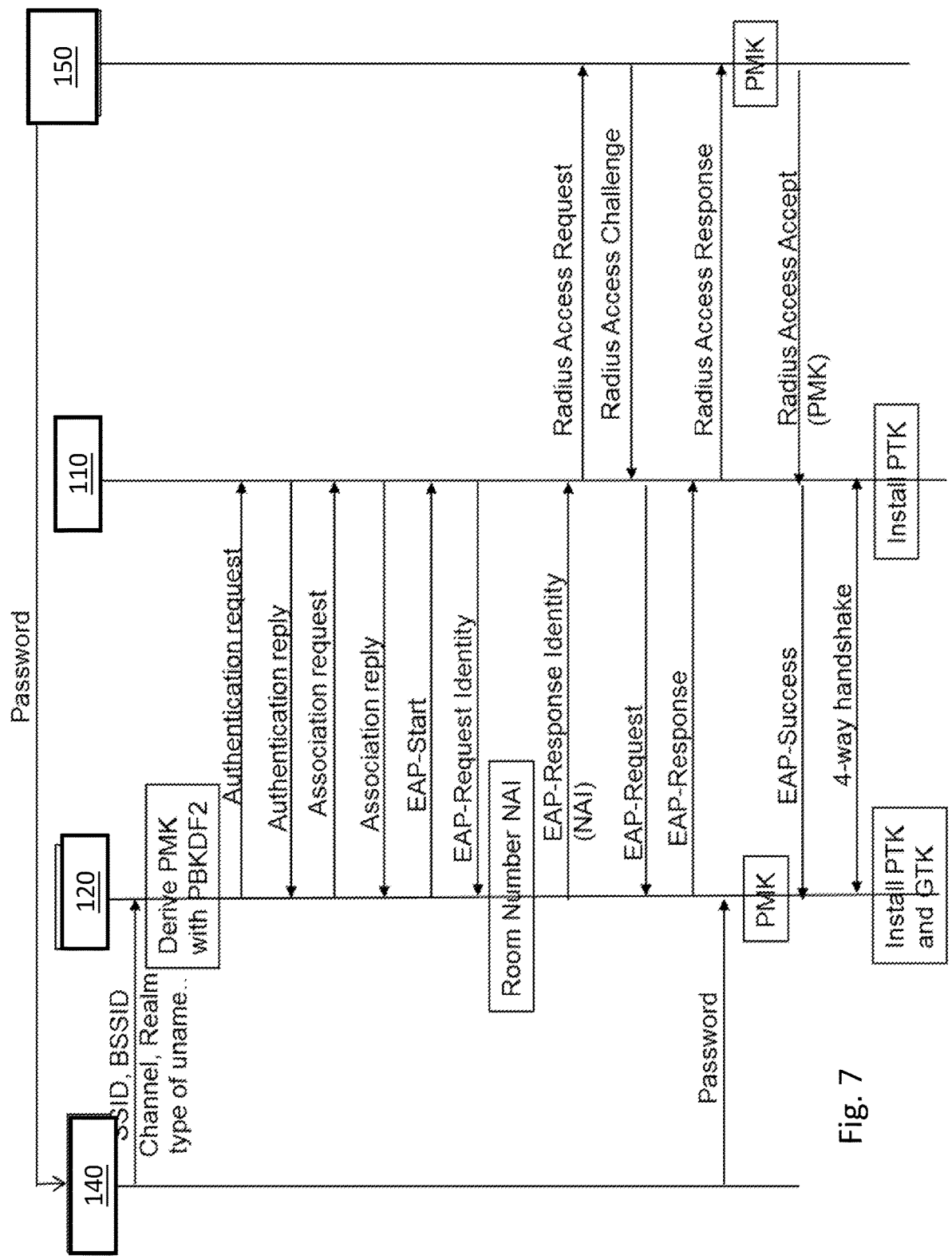
FIG. 7 is a sequence diagram depicting embodiments of a sequence of actions performed in a communications system.

FIG. 7 depicts a WPA-Enterprise 802.1x authentication with visible light communication and modified EAP method. To overcome this challenge, some embodiments are modified as shown in FIG. 7. As shown in FIG. 7 the first part of the network access information and the second part of the network access information is communicated on the visible light channel at two different stages. This relates to Actions 202-206, 302, 402-404 described above.

In these embodiments, the STA 120, such as the application the STA 120 responsible for network connection only receives the SSID, BSSID, data rate etc. information over the VLC channel, i.e. the first part of the network access information.

By using this information the STA 120, such as the application the STA 120 then initiates the connection with the appropriate AP 110.

Once the STA 120, such as the application the STA 120 receives an EAP-Identity request from the AP 110, it prompts the STA 120 or the user of the STA 120 to enter a user name. The user name may be the guest name in which the hotel was booked or the email id that was used for booking the hotel. The STA 120, such as the application the STA 120 may inform what kind of username it is expecting. This information may also be communicated over the visible light channel the first part of the network access information as shown in FIG. 7.

The STA 120, such as the application the STA 120 would then add a realm to this username, which may e.g. be @local, indicating only local authentication supported and if the first hop management server 150 cannot service this request then the STA 120 won't get Wi-Fi access, or the realm may also be communicated over the VLC channel e.g. in the first part of the network access information.

Upon receiving the identity in the EAP-Response message, the AP 110 forwards the username to the management server 150 as a radius/diameter message. The authentication sever 150 is then responsible for checking if there is an active guest account. Additionally the authentication sever 150 may e.g. enforce a total number of logins supported with that username and some data limits for accounting purposes.

Once the management server 150 has confirmed the identity, it sends the password to the STA 120 via the controller 145 and the light source 140 over the VLC channel and sends the PMK to the AP 110. The password is sent to the STA 120 as the second part of the network access information. The password sent to the STA 120 over the VLC channel may in this example be location specific. The management server 150 may estimate the location of the STA 120 based on the requesting AP 110. So if the username received corresponds to a guest in room number 428, and the request is coming from an AP on the 4th floor, then the password is communicated over the light sources in or near room 428. If the management server 150 detects that the authentication request is from an AP in a common area, such as a lounge, and then it sends the password only to those relevant light sources in the lounge.

Finally, the AP 110 and the STA 120 derive the PTK and GTK using the PMK.

Embodiments herein may also be used with a modified version of EAP-SIM/EAP-AKA/EAP-AKA' to make sure that there is a valid user in hotel with the phone number that was used during the booking. EAP for GSM Subscriber Identity Module (EAP-SIM) is used for authentication and session key distribution using the Subscriber Identity Module (SIM) from the Global System for Mobile Communications (GSM). Extensible Authentication Protocol Method for Universal Mobile Telecommunications System (UMTS) Authentication and Key Agreement (EAP-AKA) is an EAP mechanism for authentication and session key distribution using the UMTS Subscriber Identity Module (USIM). The EAP-AKA' (AKA Prime) variant of EAP-AKA, defined in RFC 5448, and is used for non-3GPP access to a 3GPP core network.

To perform the method actions for authenticating a STA 120 to access a network 115, described above in relation to FIG. 2, the communications system 100 may comprise the following arrangement. As mentioned above the STA 120 is capable of communicating with a light source 140.

The communications system 100 comprises the management server 150 being configured to send to a controller 145 of the light source 140, network access information.

The communications system 100 further comprises the controller 145 of the light source 140 being configured to send to the STA 120, the received network access information. The network access information is to be sent to the STA 120 via a VLC channel. The VLC channel is adapted to be emitted from the light source 140 and received by a light detector 122 in the STA 120.

The communications system 100 further comprises the STA 120 being configured to authenticate the STA 120 to the network 115 by sending the received network access information to the AP 110 operating in the network 115. The STA 120 is adapted to communicate with the AP 110 via a communication channel.

The network access information may be arranged to comprise any one or more out of: a Service Set Identification, SSID, a Basic Service Set Identification, BSSID, Communication channel information, username, password, certificates, channel and cipher suites supported in addition to the SSID and the password, and credentials for the AP 110 that provides network access.

In some embodiments, a first part of the network access information is to be sent to the STA 120 via the VLC channel before the STA 120 authenticates to the network 115. In these embodiments:

the AP 110 is configured to receive 20 from the STA 120, an identity of the STA 120 and sending it to the management server 150, the management server 150 is configured to authenticating, the STA 120 by using the received identity of the STA 120, the management server 150 is configured to send a second part of the network access information to the light source 140, when the STA 120 has been successfully authenticated, and the controller 145 of the light source 140 is configured to send the received second part of the network access information to the STA 120 via the VLC channel.

Figure 8:
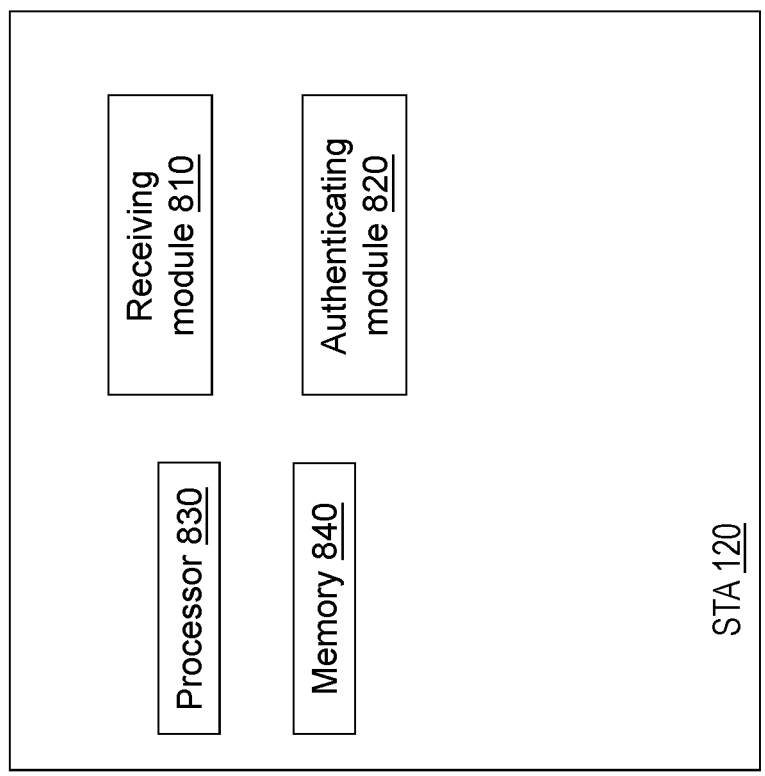
FIG. 8 is a schematic block diagram illustrating embodiments of a STA.

To perform the method actions for authenticating in the STA 120 to the network 115 described above in relation to FIG. 3, the Station, STA, 120 may comprise the following arrangement depicted in FIG. 8. As mentioned above, the STA 120 is capable of communicating with a light source 140.

The STA 120 is configured to e.g. by means of an receiving module 810 and/or a light detector 122 configured to, receive network access information from the management server 150 via a VLC channel: The VLC channel is to be emitted from the light source 140 and received by a light detector 122 in the STA 120.

The STA 120 being configured to e.g. by means of an authenticating module 820 configured to, authenticate the STA 120 to the network 115 by sending the network access information to the AP 110 adapted to operate in the Network 115. The STA 120 is arranged to communicate with the AP 110 via a communication channel.

The network access information may be adapted to comprise any one or more out of: a Service Set Identification, SSID, a Basic Service Set Identification, BSSID, communication channel information, username, password, certificates, channel and cipher suites supported in addition to the SSID and the password, and credentials for the AP 110 that provides network access.

In some embodiments, a first part of the network access information is adapted to be received before starting the authentication. In these embodiments, the STA 120 is further configured to authenticate the STA 120 to the Network 115 by:

sending the first part of the network access information to the AP 110, to authenticate the STA 120, sending an identity of the STA 120 to the AP 110 upon request, receiving a second part of the network access information from the management server 150 via the VLC channel, sending the second part of the network access information to the AP 110.

The first part of the network access information may be adapted to comprise any one or more out of SSID and BSSID, and wherein the second part of the network access information is adapted to comprise a password.

The STA 120 may further be configured to authenticate the STA 120 to the network 115 by selecting a data rate for communication with the network 115.

The embodiments herein may be implemented through one or more processors, such as a processor 830 in the STA 120 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the STA 120. One such carrier may be in the form of a CD ROM disc. It is however feasible with other data carriers such as a memory stick. The computer program code may furthermore be provided as pure program code on a server and downloaded to the STA 120.

The end user device 120 may further comprise a memory 840 comprising one or more memory units. The memory 850 comprises instructions executable by the processor 80.

The memory 840 is arranged to be used to store e.g. network access information, data, configurations, and applications to perform the methods herein when being executed in the end user device 120.

Those skilled in the art will also appreciate that the modules in the STA 120, described above may refer to a combination of analog and digital circuits, and/or one or more processors configured with software and/or firmware, e.g. stored in the memory 840, that when executed by the one or more processors such as the processor 830 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9:
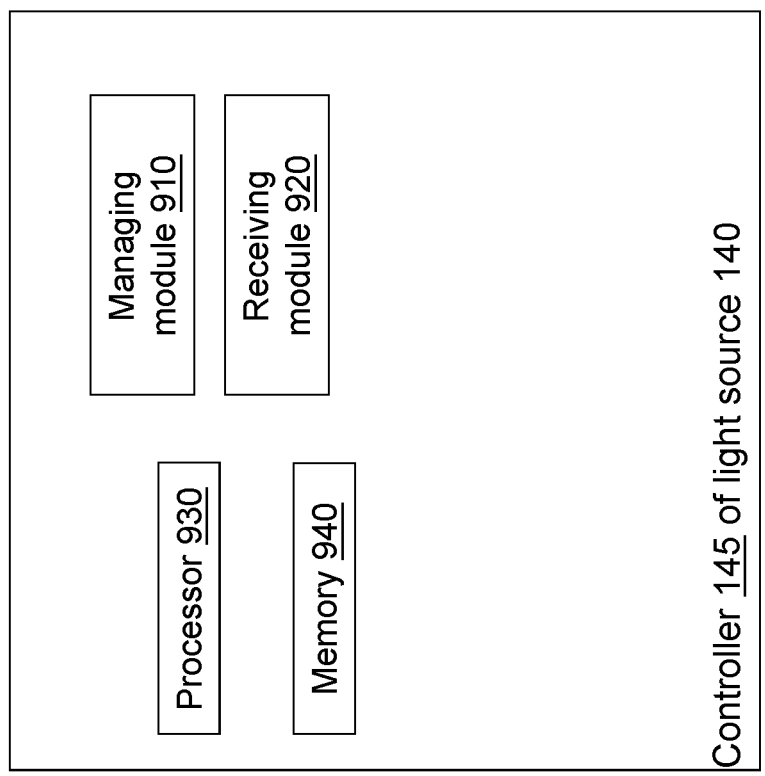
FIG. 9 is a schematic block diagram illustrating embodiments of controller of a light source.

To perform the method actions for providing authentication of the STA 120 to access a network 115, described above in relation to FIG. 4, the controller 145 of the light source 140 may comprise the following arrangement depicted in FIG. 9. As mentioned above the STA 120 is capable of communicating with the light source 140.

The controller 145 of the light source 140 is configured to, e.g. by means of a managing module 910 configured to, manage the light source 140 to send to the STA 120 network access information. The network access information is to be received from a management server 150 and sent to the STA 120 via a VLC channel. The VLC channel is adapted to be emitted from the light source 140. The network access information enables the STA 120 to authenticate to the network 115 by sending the network access information via a communication channel to an Access Point, AP, 110 operating in the Network 115.

The network access information may be adapted to comprise any one or more out of: a Service Set Identification, SSID, a Basic Service Set Identification, BSSID, communication channel information, username, password, certificates, channel and cipher suites supported in addition to the SSID and the password, and credentials for the AP 110 that provides network access.

In some embodiments, a first part of network access information is to be sent to the STA 120 via the VLC channel before the STA 120 starts the authentication to the network 115. In these embodiments the controller 145 of the light source 140 is configured to e.g. by means of a receiving module 920 configured to, receive a second part of the network access information from the management server 150, when the STA 120 has been successfully authenticated and to send the second part of the network access information to the STA via the light source 140.

The first part of the network access information may be adapted to comprise any one out of SSID and BSSID, and wherein the second part of the network access information is adapted to comprise a password.

The controller 145 of the light source 140 may be configured to e.g. by means of the managing module 910 configured to, manage the light source 140 to send to the STA 120 updated network access information.

The controller 145 of the light source 140 may be configured to e.g. by means of the managing module 910 configured to, manage the light source 140 to send to the STA 120 updated network access information repeatedly according to a predetermined frequency.

The embodiments herein may be implemented through one or more processors, such as a processor 930 in the controller 145 of the light source 140 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the controller 145 of the light source 140. One such carrier may be in the form of a CD ROM disc. It is however feasible with other data carriers such as a memory stick. The computer program code may furthermore be provided as pure program code on a server and downloaded to the controller 145 of the light source 140.

The controller 145 of the light source 140 may further comprise the memory 940 comprising one or more memory units. The memory 940 comprises instructions executable by the processor 930.

The memory 940 is arranged to be used to store network access information, data, configurations, and applications to perform the methods herein when being executed in the controller 145 of the light source 140.

Those skilled in the art will also appreciate that the modules in the controller 145 of the light source 140, described above may refer to a combination of analog and digital circuits, and/or one or more processors configured with software and/or firmware, e.g. stored in the memory 940, that when executed by the one or more processors such as the processor 930 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 10:
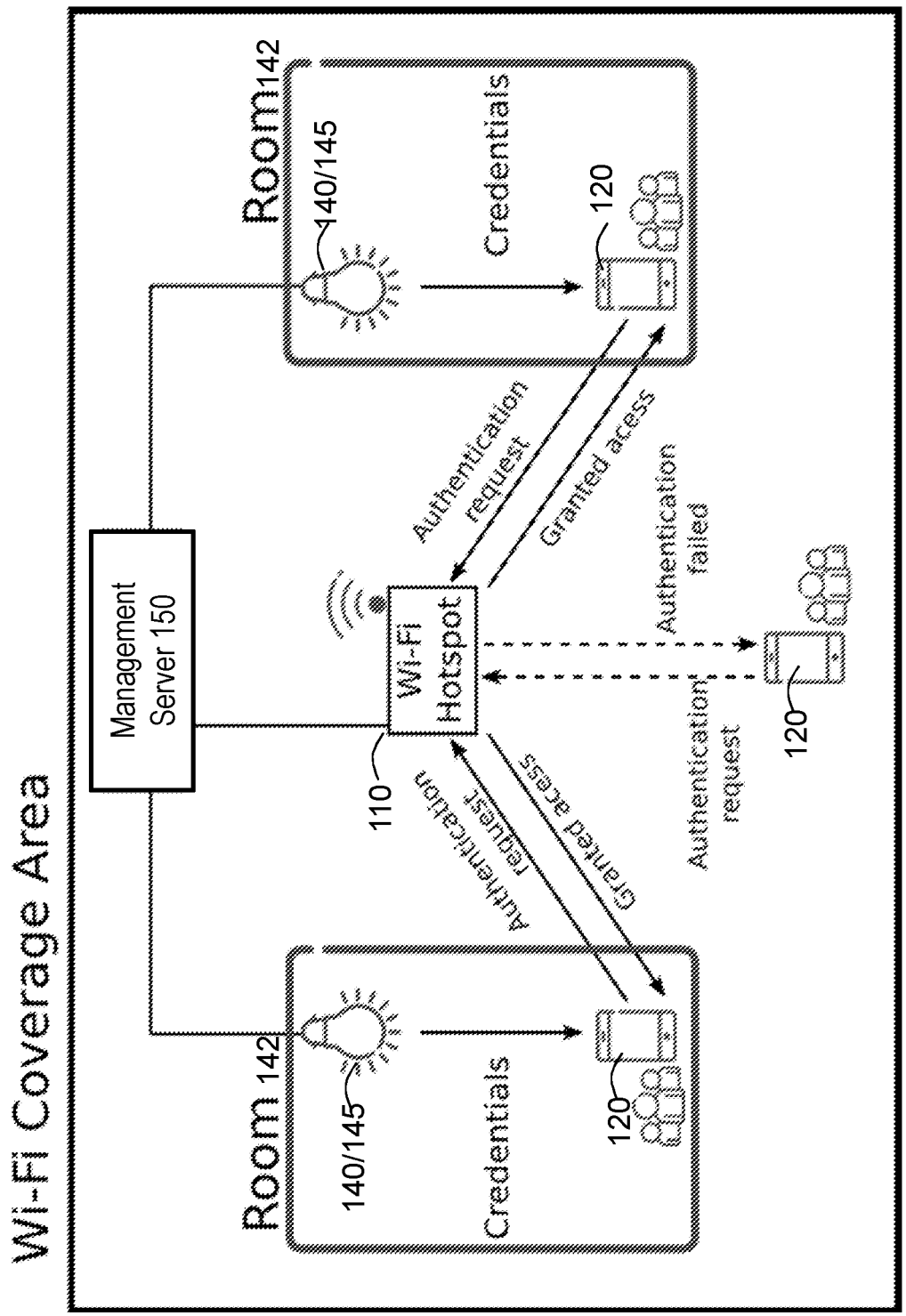
FIG. 10 is a schematic block diagram illustrating embodiments of a communications system.

Please also see FIG. 10 showing an overview of an example of the methods described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a communications system, for authenticating a station, STA, to access a network the STA being capable of communicating with a light source, the method comprising:
   sending, by a management server to a controller of the light source, network access information;
   sending, by the light source to the STA, the received network access information, the network access information being sent to the STA via a Visual Light Communication, VLC, channel, the VLC channel being emitted from the light source and received by a light detector in the STA;
   authenticating, by the STA, the STA to the network by sending the received network access information to an Access Point, AP, operating in the network, the STA communicating with the AP via a communication channel, wherein a first part of the network access information is sent to the STA via the VLC channel before the STA authenticates to the network;

receiving, by the AP from the STA, the first part network access information and an identity of the STA and sending the received identity of the STA to the management server;

authenticating, by the management server, the STA by using the received identity of the STA;

sending, by the management server, a second part of the network access information to the controller of light source, when the STA has been successfully authenticated; and sending, by the light source, the received second part of the network access information to the STA via the VLC channel.

2. The method according to claim 1, wherein the network access information comprises any one or more of: a Service Set Identification, SSID, a Basic Service Set Identification, BSSID, Communication channel information, username, password, certificates, channel and cipher suites supported in addition to the SSID and the password, and credentials for the AP that provide network access.

3. A method performed by a Station, STA, for authenticating in the STA to a network, which the STA being capable of communicating with a light source, the method comprising;

receiving network access information from a management server via a Visual Light Communication, VLC, channel, the VLC channel being emitted from the light source and received by a light detector in the STA; and authenticating the STA to the network by sending the network access information to an Access Point, AP, operating in the Network, the STA communicating with the AP via a communication channel, wherein a first part of the network access information is received before starting the authentication, wherein authenticating the STA to the network comprises:

sending the first part of the network access information to the AP to authenticate the STA;

sending an identity of the STA to the AP upon request;

receiving a second part of the network access information from the management server via the VLC channel; and sending the second part of the network access information to the AP.

4. The method according to claim 3, wherein the network access information comprises any one or more of: a Service Set Identification, SSID, a Basic Service Set Identification, BSSID, communication channel information, username, password, certificates, channel and cipher suites supported in addition to the SSID and the password, and credentials for the AP that provide network access.

5. The method according to claim 3, wherein the first part of the network access information comprises any one or more of SSID and BSSID, and wherein the second part of the network access information comprises a password.

6. The method according to claim 3, wherein authenticating the STA to the network further comprises:

selecting a data rate for communication with the network.

7. A method performed by a controller of a light source for providing authentication of an STA to access a network, the STA being capable of communicating with the light source, the controller of the light source manages the light source to perform the method comprising:

sending to the STA network access information, the network access information being received from a management server and sent to the STA via a Visual Light Communication, VLC, channel, the VLC channel being emitted from the light source, the network access information enabling the STA to authenticate to the network by sending the network access information via a communication channel to an Access Point, AP, operating in the Network, wherein a first part of network access information is sent to the STA via the VLC channel before the STA starts the authentication to the network, the method further comprising:

receiving a second part of the network access information from the management server, when the STA has been successfully authenticated.

8. The method according to claim 7, wherein the network access information comprises any one or more of: a Service Set Identification, SSID, a Basic Service Set Identification, BSSID, communication channel information, username, password, certificates, channel and cipher suites supported in addition to the SSID and the password, and credentials for the AP that provide network access.

9. The method according to claim 7, wherein the method further comprising:

sending the second part of the network access information to the STA via the light source.

10. The method according to claim 9, wherein the first part of the network access information comprises any one of SSID and BSSID, and wherein the second part of the network access information comprises a password.

11. The method according to claim 7, further comprising: sending to the STA updated network access information.

12. The method according to claim 1, wherein sending to the STA updated network access information is performed repeatedly according to a predetermined frequency.

13. A communications system, for authenticating a Station, STA, to access a network, the STA being capable of communicating with a light source, the communications system comprising:

a non-transitory computer storage medium storing computer-executable instructions which, when executed on at least one processor, cause the processor to carry out the functions of the communication system;

a management server configured to send to a controller of the light source, network access information;

the light source being configured to send to the STA the received network access information, the network access information is to be sent to the STA via a Visual Light Communication, VLC, channel, the VLC channel being configured to be emitted from the light source and received by a light detector in the STA; and the STA being configured to authenticate the STA to the network by sending the received network access information to an Access Point, AP, operating in the network, the STA being configured to communicate with the AP via a communication channel, wherein a first part of the network access information is to be sent to the STA via the VLC channel before the STA authenticates to the network, the communications system further comprising:

the AP being configured to receive from the STA, the first part access information and an identity of the STA and sending it to the management server;

the management server being configured to authenticating, the STA by using the received identity of the STA, the management server being configured to send a second part of the network access information to the controller of the light source, when the STA has been successfully authenticated, and the light source is configured to send the received second part of the network access information to the STA via the VLC channel.

14. A Station, STA, for authenticating the STA to a network the STA being capable of communicating with a light source, the STA comprising a non-transitory computer storage medium storing computer-executable instructions which, when executed on at least one processor, cause the processor to carry out the functions of the STA and the STA being configured to:

receive network access information from a management server via a Visual Light Communication, VLC, channel, the VLC channel is to be emitted from the light source and received by a light detector in the STA; and authenticate the STA to the network by sending the network access information to an Access Point, AP, configured to operate in the Network, the STA being arranged to communicate with the AP via a communication channel, wherein a first part of the network access information is adapted to be received before starting the authentication, and wherein the STA is further configured to authenticate the STA to the network by:

sending the first part of the network access information to the AP, to authenticate the STA;

sending an identity of the STA to the AP upon request;

receiving a second part of the network access information from the management server via the VLC channel;

sending the second part of the network access information to the AP.

15. A controller of a light source for providing authentication of an STA to access a network, which STA is capable of communicating with the light source, the controller comprising a non-transitory computer storage medium storing computer-executable instructions which, when executed on at least one processor, cause the processor to carry out the functions of the controller and the controller of the light source is characterized by:

the controller of the light source being configured to manage the light source to send to the STA network access information, the network access information is to be received from a management server and sent to the STA via a Visual Light Communication, VLC, channel, the VLC channel being configured to be emitted from the light source, the network access information enabling the STA to authenticate to the network by sending the network access information via a communication channel to an Access Point, AP, operating in the Network, wherein a first part of network access information is to be sent to the STA via the VLC channel before the STA starts the authentication to the network, and wherein the controller of the light source is configured to receive a second part of the network access information from the management server, when the STA has been successfully authenticated.

16. The method according to claim 8, wherein the method further comprising:

and sending the second part of the network access information to the STA via the light source.

* * * * *